United States Patent [19]

Iijima et al.

[11] 3,895,535

[45] July 22, 1975

[54] METHOD AND APPARATUS FOR INDICATING THE UNBALANCED CONDITION OF A ROTATING BODY

[75] Inventors: Yasuo Iijima; Kenji Tanaka, both of Osaka, Japan

[73] Assignee: Matsushita Electric Industrial Co., Ltd., Japan

[22] Filed: Oct. 25, 1973

[21] Appl. No.: 409,742

[52] U.S. Cl. ................................................ 73/462
[51] Int. Cl. ....................... G01m 1/22; G01m 1/26
[58] Field of Search ...................... 73/462, 466, 468

[56] References Cited
UNITED STATES PATENTS

| | | | |
|---|---|---|---|
| 2,165,992 | 7/1939 | Westendorp | 73/462 |
| 2,348,922 | 5/1944 | Pekar | 73/462 |
| 3,489,013 | 1/1970 | Taylor et al. | 73/466 |

Primary Examiner—James J. Gill
Attorney, Agent, or Firm—Robert E. Burns; Emmanuel J. Lobato; Bruce L. Adams

[57] ABSTRACT

The unbalanced condition of a rotating body is detected by faithfully converting the vibration caused by the unbalance into electrical signals. Trigger pulses are produced in response to the electrical signals for triggering a self-oscillating circuit including a high-power thyratron. The thyratron is fired simultaneously at a predetermined number of the trigger pulses by allowing electrical energy to be accumulated to a required level. The result is the generation of surge currents which repeatedly causes spark discharges to occur at an interval longer than the interval of the trigger pulses through the air gap between the surface of the rotating body and a pair of electrodes fixedly positioned relative to the body surface which is directly oxidized by the heat generated by the spark discharges and leaves a visible trace.

3 Claims, 3 Drawing Figures

METHOD AND APPARATUS FOR INDICATING THE UNBALANCED CONDITION OF A ROTATING BODY

The present invention relates to a method and an apparatus for detecting the unbalanced condition of a rotating test body and directly indicating it on the surface thereof with a cearly visible trace.

In a prior art method, a cylindrical test body is mounted on a pair of opposedly arranged bearings in alignment with the longitudinal center axis of the test body and rotated at a constant speed. The method involves electrically sensing vibrations caused by diametrical unbalance of the body and analyzing the signal to obtain information on the circumferential position of the unbalance and its magnitude. The position information is used to actuate a strobotron in synchronism with a reference signal to generate bright flashes of light which indicate the circumferential position of the unbalance on a scale provided. However, the operator has to read the scale to obtain the true position of unbalance and fix it in his memory for a while to compensate for it. Such human involvement is likely to give rise to errors. Another prior art method comprises actuating a high-power thyratron in response to electrical signals representing vibrations and discharging electrical energy stored in a capacitor through a transformer which steps up the voltage to a level required to cause a trace on the surface of a rotating test body. However, a signal operation of discharge is not sufficient to cause a visible trace and thus the surface of the rotating body is actually coated with a liquid such as alcohol which is caused to oxidize due to the heat generated by the discharge so that the trace is made clearly visible.

Briefly stated, the present invention provides an improved method wherein a cylindrical test piece is mounted on a pair of vibrational metal supports and rotated at a constant speed to generate vibration which is caused by the lack of balance of the rotating test piece. The vibration is converted into electrical signals which represent the magnitude and phase angle of the unbalance. A first train of pulses is generated by the electrical signals for triggering a high-power thyratron which is caused to repeatedly initiate a surge current flow through the air gap between the surface of the body and a pair of electrodes positioned at a fixed relationship therewith. The present invention is characterized by providing a second train of pulses which occur simultaneously at a predetermined number of the first pulses in order to allow sufficient energy to be stored for producing visible traces.

It is therefore an object of the present invention to provide an improved method for indicating the imbalance of a rotating body with a clearly visible trace which is free from the disadvantages which have been encountered in the prior art methods.

Another object of the invention is to provide an improved method for indicating imbalance in a highly efficient manner.

These and other objects and features of the present invention will be better understood from the following description taken in conjunction with the accompanying drawings, in which.

Figure 1:
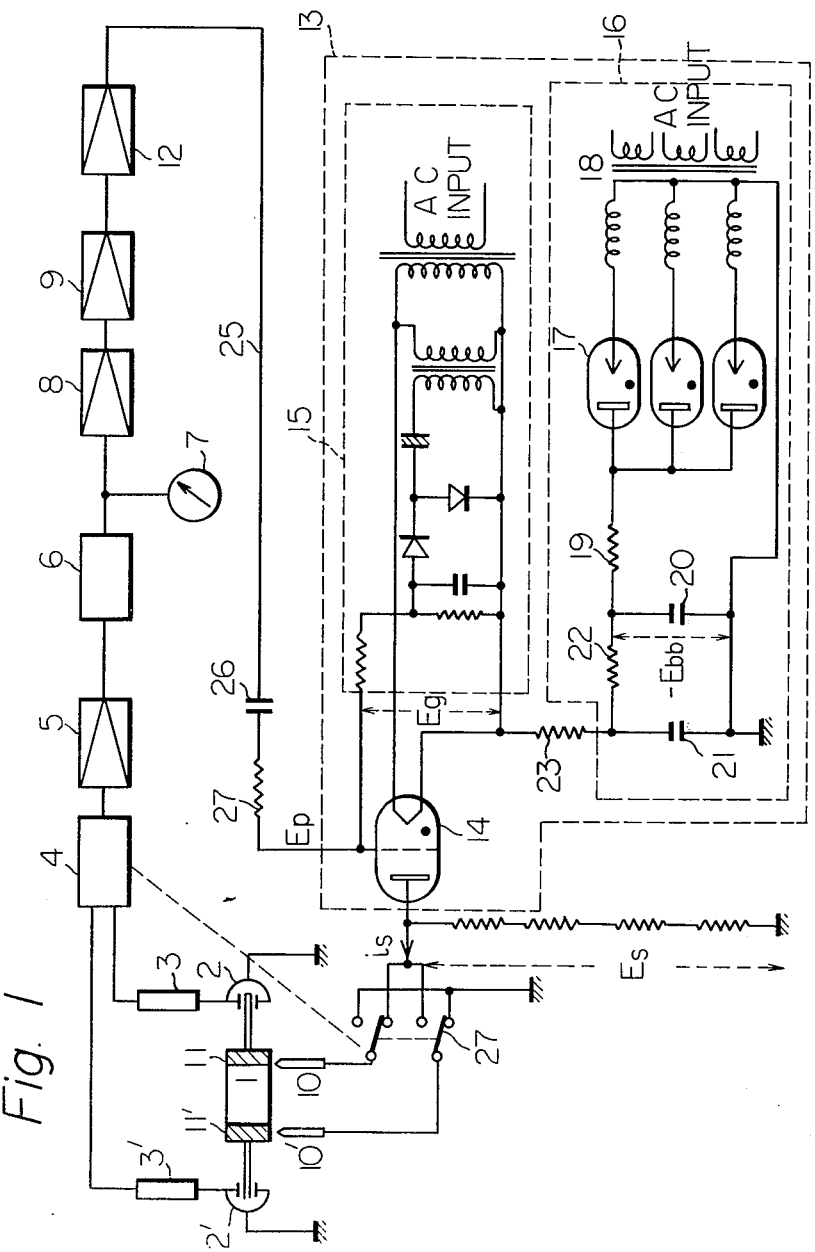
FIG. 1 is a schematic circuit block diagram employed in the practice of the present invention.
Figure 3:
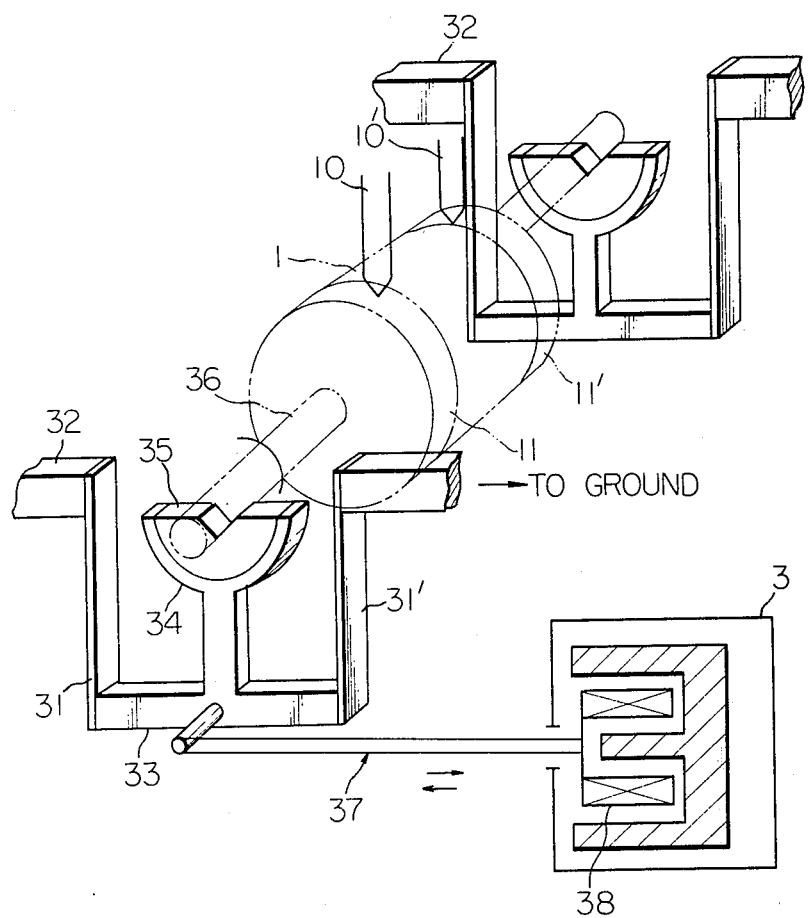
FIG. 3 is a schematic perspective view of an apparatus used for measuring the lack of balance of a rotating body in accordance with the present invention.

In FIG. 1 a cylindrical body 1 to be subjected to test is mounted on a pair of vibrational supports 2 and 2' and driven by a belt drive system (not shown). The test body freely ratates on the supports. In FIG. 3 each of the vibrational supports is shown and comprises a pair of leaf springs 31, 31' supported at one end thereof on a stationary support 32 and fastened to each other by a transverse member 33 at the other end thereof. On the transverse member 33 is fixedly mounted a generally "Y" shaped support 34 with a soft metal portion 35 made of, for example, copper. The copper portion 35 have a V shaped groove to carry each of the shafts 36 extending axially from the opposite ends of the rotating body 1. The transverse member 33 is movably connected by a rod 37 to a moving coil 38 of one of electromechanical sensors 3, 3'. The copper support 35 has the dual purposes of reducing the wear of the shaft 36 due to friction and of providing a passage for discharge currents. Turning now to FIG. 1, the sensors 3 and 3' convert the mechanical vibration of the rotating body into electrical signals, which are then fed into a computation circuit 4 which is of the type known in the field of this art. The circuit 4 analyzes these signals one at-a-time basis for each of the sensors 3 and 3' to produce a signal whose phase angle represents the point of imbalance on the circumference of the body 1 and whose amplitude represents the magnitude of the imbalance. The signal is amplified at an amplifier 5 and fed into an active filter 6 which allows only the fundamental frequency component to pass therethrough, thereby eliminating unwanted frequency components. A meter 7 is connected to the output of the active filter to measure the average value of the signal amplitude. The signal is shifted in phase by a phase shift circuit 8 to compensate for the phase angle difference between the relative positions of the sensors 3, 3' and electrodes 10, 10' which will be described hereinbelow. The signal is shaped by a waveform shaping circuit 9 and amplified by a pulse amplifier 12 to a voltage level sufficient to drive a high-output pulser 13. The high-output pulser 13 is of a self-oscillating type and comprises generally a highvoltage thyratron 14, a bias circuit 15 and a power supply circuit 16. The bias circuit 15 is of the conventional type which provides a direct current voltage to bias the grid electrode of the thyratron 14. The power supply circuit 16 comprises three high-voltage rectifiers 17 connected to the secondary windings of the input transformer 18. The anodes of the rectifiers 17 are connected to a smoothing circuit which comprises a resistor 19 and a capacitor 20. The voltage developed across the capacitor 20 serves as an anode voltage which reaches about 10 kilovolts d.c. The anode voltage charges a capacitor 21 through a resistor 22 which constitutes together with the capacitor 21 a time constant circuit which determines the repetition rate of discharge. The capacitor 21 is connected in series with the thyratron 14 to supply spark discharge current thereto by way a resistor 23 which serves to protect the thyratron. A resistor 24 is connected between the anode and ground to provide a sharply defined trace regardless of the varying surface air gap. The signal at the output of the pulse amplifier 12 is applied on lead 25 by way of a capacitor 26 and a resistor 27 to the grid electrode of the thyratron 14 to which the bias voltage is also applied. The thyratron 14 will be fired if, when an input trigger pulse is applied to the grid, the anode potential is of such a magnitude as to initiate firing. When the thyratron is fired, the electrical energy stored in the capacitor 21 is discharged through the anode circuit, the rotating body 1 to ground causing a spark discharge to occur between the electrodes 10, 10' and the surface of the opposite edge portions 11 and 11' of the rotating body. The spark discharge produces a trace on the surface of the rotating body to indicate the position of imbalance. However, if the time constant determined by the capacitor 21 and resistor 22 is such that discharge occurs each time the input is applied to the grid, the capacitor 21 will now be allowed a sufficient time to accumulate electrical energy sufficient to cause a visible trace. For example, if the test body is rotated at 2400 rpm which will produce trigger pulses at a repetition rate of 40 Hz and at this rate, the value of the capacitor 21 must be so small that sufficient power will not be obtained to produce visible traces.

In accordance with the present invention, the spark discharge rate is determined such that discharge occurs simultaneously at a predetermined number of the trigger pulses so that the capacitor 21 is allowed a sufficient time to accumulate enough electrical energy to produce clearly visible traces.

Figure 2:
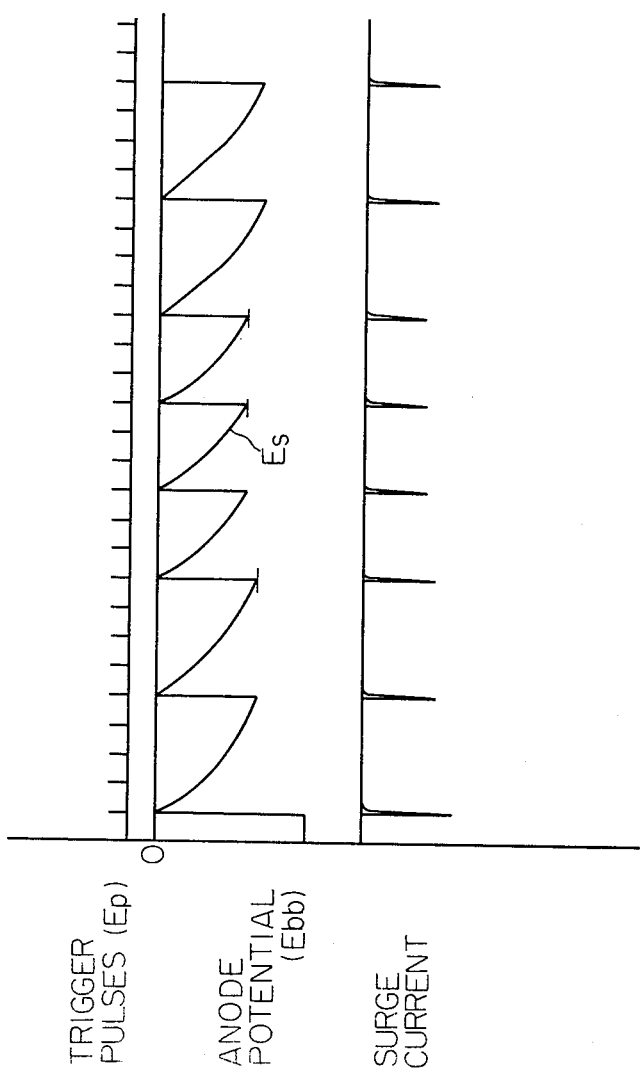
FIG. 2 shows various waveforms useful for describing the present invention.

In FIG. 2 the firing condition of the thyratron 14 is shown. Since vibration usually contains miscellaneous vibrations of higher frequency components which superimpose over the fundamental frequency component of the vibration, and in addition the electrodes 10 and 10' are positioned at right angles with respect to the sensors 3 and 3', the air gap between the electrodes and the rotating body surface varies at a rate lower than the fundamental vibration frequency. According to the present invention, the thyratron 14 is fired at a predetermined firing voltage which varies as a function of the grid bias voltage Eg and the anode load impedance Zp which in turn varies with the air gap. Therefore, the firing voltage is a function of the air gap. When the air gap increases, the firing voltage increases correspondingly and a larger surge current would flow through the thyratron. In other words, the capacitor 21 is discharged only when electrical energy of a sufficient magnitude corresponding to the magnitude of the air gap is stored therein. Assume that the anode voltage is −10,000 volts, resistor 22 is 20 kiloohms, capacitor 21, 4 microfarads and the rotating cycle, 1/40 seconds, the spark discharge will occur every three to four trigger pulses as shown in FIG. 2. When the spark gap is small the spark discharge occurs every three trigger pulses while it is relatively large the spark discharge occurs every four trigger pulses. After the test body has been rotated for a period of about 1 to 2 seconds, a spark discharge occurs repeatedly on the same circumferential position of the rotating body to produce visible traces directly thereon.

The switch 25, which is operatively associated with the circuit 4, is connected between the anode and the electrodes 10, 10' so as to distribute each of the signals from the sensors 3 and 3' to the corresponding electrodes.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An apparatus for indicating imbalanced masses in a rotating body, comprising, means for rotating a body, means for detecting imbalance of said body and generating vibrations corresponding to the imbalance due to imbalanced masses on said body, means responsive to said vibrations for generating electrical signals corresponding to vibrations of said body due to said imbalanced masses, means for producing a train of pulses in response to said electrical signals having a frequency equal to said electrical signals, a circuit for producing surge currents comprising a thyratron, means comprising a pair of electrodes positioned spaced relative to the surface of said rotating body and defining a load impedance circuit in series with said thyratron, a time constant circuit connected in series with said thyratron for discharging electrical energy in correspondence with an air gap between said electrodes and the surface of said rotating body, a direct current source for charging said time constant circuit, means connecting the grid electrode of said thyratron to receive said train of pulses, whereby said time constant circuit is caused to repeatedly discharge its stored energy simultaneously with a predetermined number of said pulses and develop a spark from said electrodes to the surface of the rotating body marking the location of the masses thereof causing imbalance.

2. An apparatus as claimed in claim 1, including a resistor in said impedance circuit.

3. A method for indicating imbalance of a rotatable body comprising, rotating a body and developing vibrations representative of the location of imbalanced masses on the rotating body, converting the vibrations to electrical signals, converting said electrical signals into a train of pulses each occurring once during several revolutions of said body, storing electrical energy for the intervals of rotation of said body corresponding to said pulses, discharging the stored energy corresponding to the individual intervals to develop sparks on the surface of said rotating body marking the location of said imbalanced masses on said body.

* * * * *